United States Patent
Kobayashi et al.

(10) Patent No.: US 7,405,376 B2
(45) Date of Patent: Jul. 29, 2008

(54) PROCESSING APPARATUS USING LASER BEAM

(75) Inventors: Satoshi Kobayashi, Tokyo (JP); Yukio Morishige, Tokyo (JP)

(73) Assignee: Disco Corporation, Tokyo (JP)

( * ) Notice: Subject to any disclaimer, the term of this patent is extended or adjusted under 35 U.S.C. 154(b) by 0 days.

(21) Appl. No.: 10/981,524

(22) Filed: Nov. 5, 2004

(65) Prior Publication Data

US 2005/0098548 A1    May 12, 2005

(30) Foreign Application Priority Data

Nov. 6, 2003    (JP) .............................. 2003-377190

(51) Int. Cl.
  *B23K 26/00* (2006.01)
  *H01L 21/02* (2006.01)
(52) U.S. Cl. ............................. 219/121.68; 219/121.77; 438/463
(58) Field of Classification Search ..............................
    219/121.67–121.69, 121.72, 121.77; 216/65, 216/94; 156/272.8; 438/463; 225/2
  See application file for complete search history.

(56) References Cited

U.S. PATENT DOCUMENTS

| | | | | | |
|---|---|---|---|---|---|
| 3,604,890 | A | * | 9/1971 | Mullaney et al. | ........ 219/121.67 |
| 3,753,616 | A | * | 8/1973 | Goethert | ...................... 356/28 |
| 4,013,365 | A | * | 3/1977 | Vali et al. | .................... 356/460 |
| 4,088,410 | A | * | 5/1978 | Smith | ......................... 356/390 |
| 4,623,776 | A | * | 11/1986 | Buchroeder et al. | .... 219/121.67 |
| 4,662,708 | A | * | 5/1987 | Bagdal | ........................ 359/210 |
| 4,854,705 | A | * | 8/1989 | Bachalo | ....................... 356/336 |
| 5,093,548 | A | * | 3/1992 | Schmidt-Hebbel | ..... 219/121.71 |
| 5,293,389 | A | | 3/1994 | Yano et al. | |
| 5,396,361 | A | * | 3/1995 | Sasaki et al. | .................... 398/1 |
| 5,728,993 | A | * | 3/1998 | O'Neill | ................. 219/121.67 |
| 5,748,318 | A | * | 5/1998 | Maris et al. | .................. 356/630 |
| 5,760,366 | A | * | 6/1998 | Haruta et al. | .......... 219/121.68 |
| 5,925,268 | A | * | 7/1999 | Britnell | .................. 219/121.63 |
| 6,055,097 | A | * | 4/2000 | Lanni et al. | ................. 359/386 |
| 6,211,485 | B1 | * | 4/2001 | Burgess | .................... 219/121.7 |
| 6,211,488 | B1 | | 4/2001 | Hoekstra et al. | |
| 6,224,589 | B1 | * | 5/2001 | Brenner et al. | ................. 606/10 |
| 6,330,019 | B1 | * | 12/2001 | Kubokawa | .................. 347/241 |

(Continued)

FOREIGN PATENT DOCUMENTS

CN    1022361 C    10/1993

(Continued)

OTHER PUBLICATIONS

U.S. Appl. No. 10/885,311, filed Jul. 7, 2004, entitled Machining Apparatus Utilizing Beam.

*Primary Examiner*—Samuel M Heinrich
(74) *Attorney, Agent, or Firm*—Smith, Gambrell & Russell, LLP

(57) ABSTRACT

Disclosed herein is a processing apparatus using a laser beam, which includes a holder for holding a workpiece, and laser beam applicator for irradiating the workpiece, held by the holder, with a pulsed laser beam capable of passing through the workpiece, thereby deteriorating the workpiece. The laser beam applicator includes a pulsed laser beam oscillator and a transmitter/focuser for transmitting and focusing the pulsed laser beam oscillated by the pulsed laser beam oscillator. The transmitter/focuser focuses the pulsed laser beam, with a time difference provided, to at least two focus points that are displaced in the optical axis direction.

5 Claims, 4 Drawing Sheets

U.S. PATENT DOCUMENTS

| | | | |
|---|---|---|---|
| 6,347,103 B1 * | 2/2002 | Song et al. | 372/36 |
| 6,521,864 B2 * | 2/2003 | Bertez et al. | 219/121.72 |
| 6,664,498 B2 * | 12/2003 | Forsman et al. | 219/121.6 |
| 6,720,567 B2 * | 4/2004 | Fordahl et al. | 250/559.29 |
| 6,747,735 B2 * | 6/2004 | Chen et al. | 356/301 |
| 6,787,734 B2 * | 9/2004 | Liu | 219/121.7 |
| 2003/0118283 A1 * | 6/2003 | Healy | 385/33 |
| 2005/0018996 A1 * | 1/2005 | Seo et al. | 385/147 |
| 2005/0056626 A1 * | 3/2005 | Gross et al. | 219/121.77 |
| 2005/0264776 A1 * | 12/2005 | Baer | 355/43 |
| 2006/0261050 A1 * | 11/2006 | Krishnan et al. | 219/121.74 |

FOREIGN PATENT DOCUMENTS

| | | | |
|---|---|---|---|
| EP | 000706072 A2 | * | 4/1996 |
| JP | 5-29693 | | 2/1993 |
| JP | 406250124 A | * | 9/1994 |
| JP | 411285886 A | * | 10/1999 |
| JP | 02000005892 A | * | 1/2000 |
| JP | 02000210785 A | * | 8/2000 |
| JP | 2002-192367 | | 7/2002 |
| JP | 2002-205180 | | 7/2002 |
| JP | 02003273341 A | * | 9/2003 |
| JP | 02003279885 A | * | 10/2003 |

* cited by examiner

PROCESSING APPARATUS USING LASER BEAM

FIELD OF THE INVENTION

This invention relates to a processing apparatus using a laser beam and, more particularly, a processing apparatus comprising holding means for holding a workpiece, and laser beam application means for irradiating the workpiece, which is held by the holding means, with a pulsed laser beam capable of passing through the workpiece, thereby deteriorating the workpiece.

DESCRIPTION OF THE PRIOR ART

In the production of a semiconductor device, for example, it is well known that many semiconductor circuits are formed on the face of a wafer, including a suitable substrate, such as a silicon substrate, a sapphire substrate, a silicon carbide substrate, a lithium tantalate substrate, a glass substrate, or a quartz substrate, and then the wafer is divided to produce individual semiconductor circuits, namely, semiconductor devices. Various modes using a laser beam are proposed as methods for dividing the wafer.

U.S. Pat. No. 6,211,488 and Japanese Patent Application Laid-Open No. 2001-277163 each disclose a wafer dividing method which focuses a pulsed laser beam onto an intermediate portion in the thickness direction of a wafer, moves the pulsed laser beam and the wafer relative to each other along a division line to generate a deterioration region along the division line in the intermediate portion in the thickness direction of the wafer, and then exerts an external force on the wafer to break the wafer along the deterioration region.

It is conceivable not only to generate the deterioration region in the intermediate portion in the thickness direction of the wafer, but also to form a deterioration region along the division line in a portion ranging from the back of the wafer to a predetermined depth, or in a portion ranging from the face of the wafer to a predetermined depth, instead of or in addition to the intermediate portion in the thickness direction of the wafer. In each case, in order to exert an external force on the wafer to break the wafer along the division line sufficiently precisely, it is necessary to provide a relatively large thickness of the deterioration region, namely, a relatively large dimension of the deterioration region in the thickness direction of the wafer. To increase the thickness of the deterioration region, there is need to displace the position of the focus point of the pulsed laser beam in the thickness direction of the wafer, and repeatedly move the pulsed laser beam and the wafer relative to each other along the division line, because the deterioration region is generated in the vicinity of the focus point of the pulsed laser beam. If the thickness of the wafer is relatively large, therefore, it takes a relatively long time to generate the deterioration region of a necessary thickness to break the wafer sufficiently precisely.

In an attempt to solve the above-described problems, the specification and drawings of Japanese Patent Application No. 2003-273341, filed by the applicant (the assignee) of the present application, disclose a processing apparatus adapted to focus a pulsed laser beam to at least two focus points displaced in the direction of the optical axis. According to such a processing apparatus, deterioration regions can be simultaneously generated on at least two sites displaced in the thickness direction of a workpiece, namely, a wafer. However, the processing apparatus is still not sufficiently satisfactory, but poses the following problems to be solved: Deterioration at one of the two focus points, more specifically, the focus point at a shorter distance from pulsed laser beam oscillation means, inhibits application of the pulsed laser beam to the other focus point, more specifically, the focus point at a longer distance from the pulsed laser beam oscillation means, thereby inhibiting the generation of desired deterioration.

SUMMARY OF THE INVENTION

It is a principal object of the present invention, therefore, to provide a novel and improved processing apparatus using a laser beam, the processing apparatus being capable of generating deterioration, as desired, on at least two focus points displaced in the thickness direction of a workpiece, while ingeniously avoiding a situation where deterioration of one of the two focus points inhibits application of a pulsed laser beam to the other focus point, thereby generating a deterioration region of a required thickness in the workpiece.

We, the inventors, diligently conducted studies and experiments, and have found the following facts: A pulsed laser beam is focused, with some time difference provided, to at least two focus points displaced in the optical axis direction of the pulsed laser beam, accordingly, displaced in the thickness direction of a workpiece. As a result, a situation where deterioration at one of the focus points inhibits application of the pulsed laser beam to the other focus point can be avoided. Thus, the aforementioned principal object can be attained.

That is, according to the present invention, as a processing apparatus using a laser beam for attaining the above-mentioned principal object, there is provided a processing apparatus using a laser beam, which comprises holding means for holding a workpiece, and laser beam application means for irradiating the workpiece, held by the holding means, with a pulsed laser beam capable of passing through the workpiece, thereby deteriorating the workpiece, the laser beam application means including pulsed laser beam oscillation means and transmitting/focusing means for transmitting and focusing the pulsed laser beam oscillated by the pulsed laser beam oscillation means, wherein the transmitting/focusing means focuses the pulsed laser beam, with a time difference provided, to at least two focus points displaced in the optical axis direction of the pulsed laser beam.

Preferably, the transmitting/focusing means focuses the laser beam to the focus point at a longer distance from the pulsed laser beam oscillation means earlier than the focus point at a shorter distance from the pulsed laser beam oscillation means. The time difference during focusing between the focus points adjacent in the optical axis direction is preferably not smaller than one pulse duration of the pulsed laser beam, but not larger than a time interval between successive pulses of the pulsed laser beam. In a preferred embodiment, the transmitting/focusing means includes a splitter for dividing the pulsed laser beam from the pulsed laser beam oscillation means into a first pulsed laser beam and a second pulsed laser beam; a plurality of mirrors for aligning the optical axis of the second pulsed laser beam with the optical axis of the first pulsed laser beam; diameter changing means for changing the diameter of one of the first pulsed laser beam and the second pulsed laser beam; and a common focusing lens. Preferably, the transmitting/focusing means includes optical path length increasing means for increasing the optical path length of one of the first pulsed laser beam and the second pulsed laser beam. The optical path length increasing means preferably includes an optical fiber or a plurality of mirrors.

In the processing apparatus using a laser beam according to the present invention, a time difference is caused to exist in the focusing of the pulsed laser beam at each of at least two focus points. Hence, a situation where deterioration generated at one of the focus points inhibits application of the pulsed laser beam to the other focus point is avoided. Consequently, deterioration, as desired, can be generated on at least two focus points.

DETAILED DESCRIPTION OF THE PREFERRED EMBODIMENTS

Preferred embodiments of a processing apparatus using a laser beam, which is constructed in accordance with the present invention, will now be described in greater detail by reference to the accompanying drawings.

Figure 1:
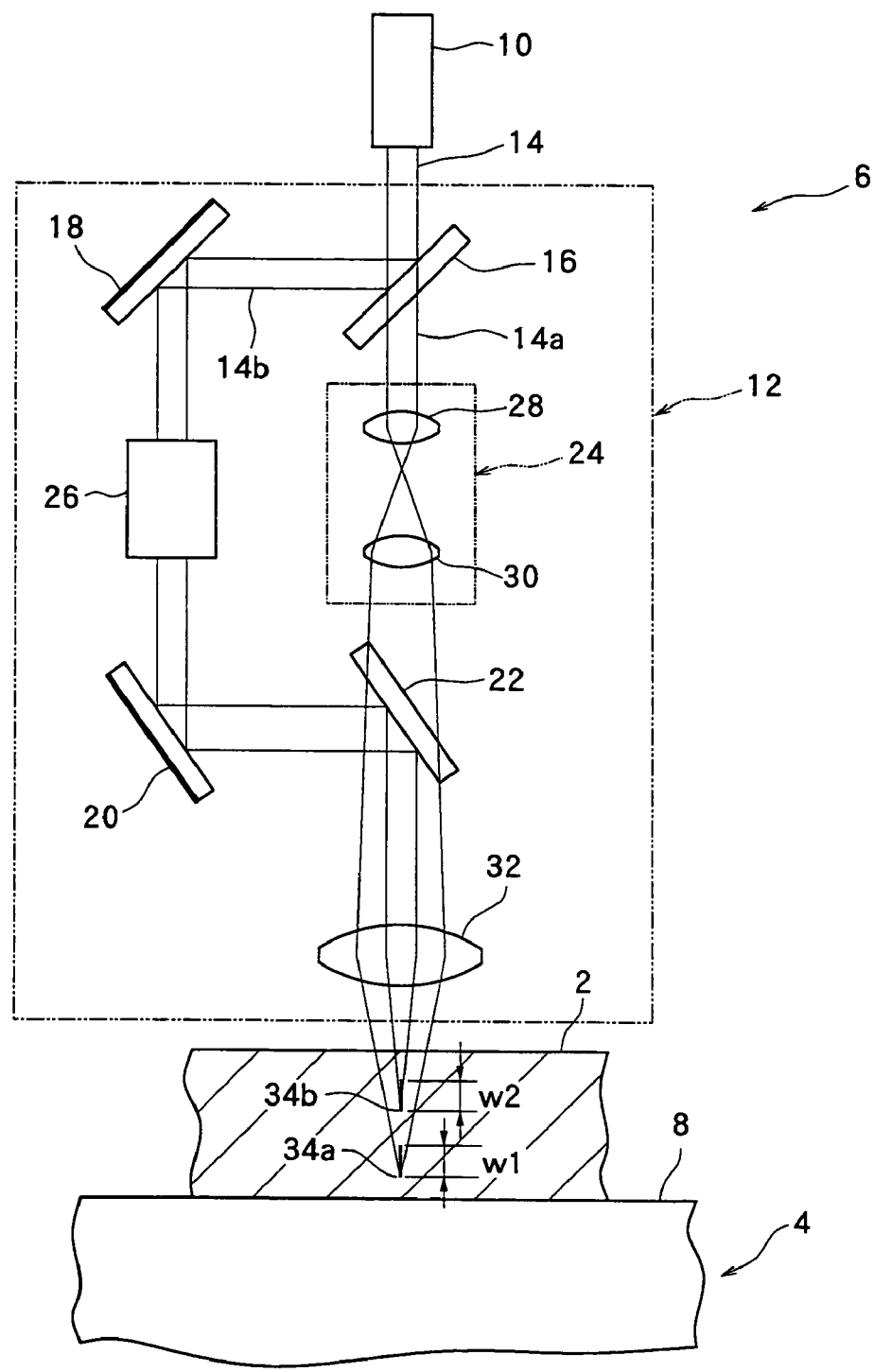
FIG. 1 is a schematic view showing a preferred embodiment of a processing apparatus constructed in accordance with the present invention.

FIG. 1 schematically shows a preferred embodiment of a processing apparatus constructed in accordance with the present invention. The illustrated processing apparatus comprises holding means 4 for holding a workpiece 2, and laser beam application means indicated entirely at the numeral 6.

The holding means 4 is composed of a holding member 8 formed, for example, from a porous member or having a plurality of suction holes or grooves formed therein, and suction means (not shown) annexed to the holding member 8. The holding means 4 may be of a form in which the workpiece 2, for example, a wafer, is attracted to the surface of the holding member 8 by suction.

The laser beam application means 6 includes pulsed laser beam oscillation means 10, and transmitting/focusing means 12 for transmitting and focusing a pulsed laser beam oscillated by the pulsed laser beam oscillation means 10. Importantly, the pulsed laser beam oscillation means 10 oscillates a pulsed laser beam 14 which can pass through the workpiece 2. If the workpiece 2 is a wafer including a silicon substrate, a sapphire substrate, a silicon carbide substrate, a lithium tantalate substrate, a glass substrate, or a quartz substrate, the pulsed laser beam oscillation means 10 can be advantageously formed from a YVO4 pulsed laser oscillator or a YAG pulsed laser oscillator which oscillates the pulsed laser beam 14 having a wavelength of, for example, 1064 nm.

With reference to FIG. 1, the transmitting/focusing means 12 in the laser beam application means 6 is interposed between the pulsed laser beam oscillation means 10 and the workpiece 2 held on the holding means 4. The transmitting/focusing means 12 in the illustrated embodiment includes a half mirror 16 functioning as a splitter, a mirror 18, a mirror 20, a half mirror 22, diameter changing means 24 disposed between the half mirror 16 and the half mirror 22, and optical path length increasing means 26 disposed between the mirror 18 and the mirror 20. The diameter changing means 24 is composed of an expander having two convex lenses 28 and 30. The optical path length increasing means 26 for increasing the optical path between the mirror 18 and the mirror 20 by, for example, several meters can be composed of an optical fiber extending, for example, over several meters. Alternatively, the optical path length increasing means 26 can be composed of a plurality of mirrors instead of, or in addition to, the optical fiber. The transmitting/focusing means 12 further includes a focusing lens 32 for focusing the pulsed laser beam 14.

In the above-described processing apparatus, the pulsed laser beam 14 oscillated from the pulsed laser beam oscillation means 10 is separated by the half mirror 16 into two pulsed laser beams 14a and 14b, namely, the first pulsed laser beam 14a which passes through the half mirror 16 and advances straightly, and the second pulsed laser beam 14b which is reflected by the half mirror 16 and changed in direction to a substantially perpendicular direction. The first pulsed laser beam 14a passes through the diameter changing means 24, and thereby has its diameter changed, more specifically, is converted into a form in which its diameter gradually increases as the first pulsed laser beam 14a goes farther from the diameter changing means 24. Then, the first pulsed laser beam 14a passes through the half mirror 22, and is focused by the focusing lens 32 to a focus point 34a in the workpiece 2. On the other hand, the second pulsed laser beam 14b is reflected by the mirror 18, the mirror 20, and the half mirror 22 to be changed in direction to a substantially perpendicular direction at each time, and is finally brought into a state where its optical axis aligns with the optical axis of the first pulsed laser beam 14a. Then, the second pulsed laser beam 14b is focused by the focusing lens 32 to a focus point 34b in the workpiece 2. As clearly shown in FIG. 1, the focus point 34a and the focus point 34b are displaced in the optical axis direction of the first and second pulsed laser beams 14a and 14b, and the focus point 34a is located more remotely from the pulsed laser beam oscillation means 10 than the focus point 34b. The position of the focus point 34a can be adjusted, as appropriate, by moving the expander, which constitutes the diameter changing means 24, in the optical axis direction, or by moving the convex lens 28 or 30 of the expander in the optical axis direction.

Figure 2:
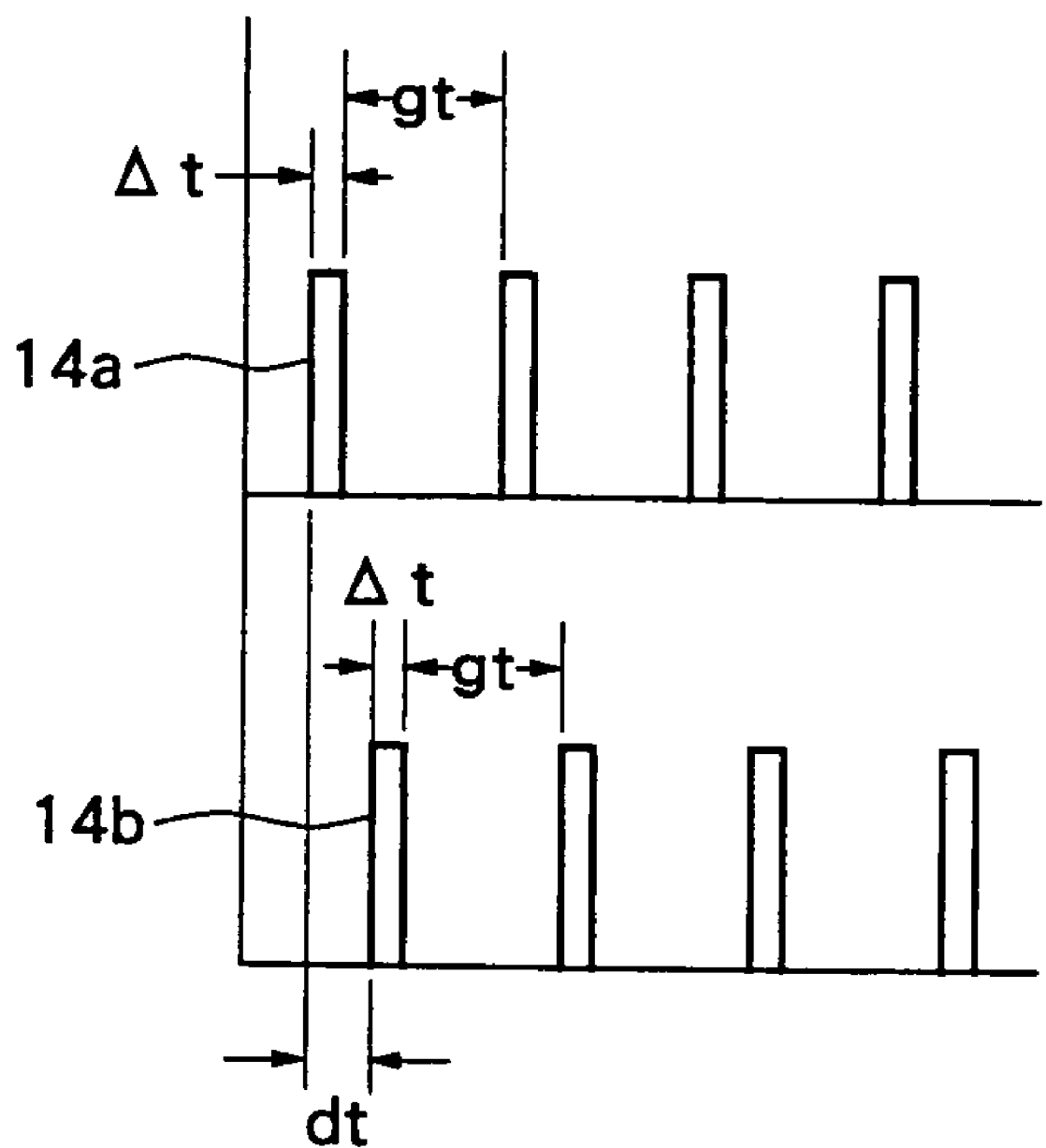
FIG. 2 is a graph showing a time difference during focusing between a first pulsed laser beam and a second pulsed laser beam in the processing apparatus of FIG. 1.

In the illustrated embodiment, the optical path of the second pulsed laser beam 14b extends to the half mirror 22 via the half mirror 16, the mirror 18, the optical path length increasing means 26, and the mirror 20, so that the optical path length of the second pulsed laser beam 14b is increased by, for example, several meters as compared with the optical path length of the first pulsed laser beam 14a. Thus, the second pulsed laser beam 14b arrives at the focus point 34b later than a point in time, when the first pulsed laser beam 14a reaches the focus point 34a, by a time required for the second pulsed laser beam 14b to pass over the increased optical path length. As shown in FIG. 2, it is preferred that a time difference dt between the point in time, when the first pulsed laser beam 14a arrives at the focus point 34a, and a point in time, when the second pulsed laser beam 14b arrives at the focus point 34b, is not smaller than one pulse duration (pulse width) $\Delta t$ of the pulsed laser beam 14a (or 14b), but not larger than a time interval gt between successive pulses of the pulsed laser beam 14a (or 14b), and that each pulse of the second pulsed laser beam 14b is located between respective pulses of the first pulsed laser beam 14a. For example, let each pulse duration of the pulsed laser beams 14a and 14b be $\Delta t$ (seconds), and the repetition frequency of the pulsed laser beams 14a and 14b be W (Hz), and the difference between the optical path length (L1) of the first pulsed laser beam 14a and the optical path length (L2) of the second pulsed laser beam 14b be DL. Since the velocity of light is c ($=3 \times 10^8$ m/second), the above time difference dt is (L2−L1)÷c. Thus, the second optical path length L2 may be increased so as to satisfy $\Delta t \times c \leq (L2-L1) \leq (1/W - \Delta t) \times c$. For example, if the pulse duration $\Delta t$ is 10 ns, and the pulse repetition frequency W is 100 k (Hz), then it is recommendable to increase the optical path length L2 of the second pulsed laser beam 14b by about 3 m as compared with the optical path length L1 of the first pulsed laser beam 14a.

When the first pulsed laser beam 14a is focused to the focus point 34a, deterioration is generated in the workpiece 2, because of this focusing, in the vicinity of the focus point 34a, usually, in a region having some width W1 from the focus point 34a upward. When the second pulsed laser beam 14b is focused to the focus point 34b, deterioration is generated in the workpiece 2 in the vicinity of the focus point 34b, usually, in a region having some width W2 from the focus point 34b upward. If the arrival of the first pulsed laser beam 14a at the focus point 34a, and the arrival of the second pulsed laser beam 14b at the focus point 34b are substantially simultaneous, there is a tendency that the first pulsed laser beam 14a focused to the focus point 34a is adversely affected by the deterioration generated at the focus point 34b, and the generation of desired deterioration in the vicinity of the focus point 34a is inhibited. Assume, by contrast, that the first pulsed laser beam 14a is focused to the focus point 34a to start the generation of deterioration in the vicinity of the focus point 34a, and then, with a time difference provided, the second pulsed laser beam 14b is focused to the focus point 34b to start the generation of deterioration in the vicinity of the focus point 34b. In this case, the situation where the focusing of the first pulsed laser beam 14a to the focus point 34a is inhibited by the generation of deterioration by the second pulsed laser beam 14b in the vicinity of the focus point 34b is fully avoided, and desired deterioration can be generated in the vicinity of the focus point 34a and in the vicinity of the focus point 34b. The above-mentioned deterioration in the workpiece 2 occurs as melting and resolidification (namely, melting when the laser beams 14a and 14b are focused, and solidification after the focusing of the pulsed laser beams 14a and 14b is completed), and appears as voids or cracks, although this is dependent on the material for the workpiece 2, or the intensity of the pulsed laser beams 14a and 14b focused. When the laser beam application means 6 and the holding means 4 are relatively moved along the division line extending, for example, in the right-and-left direction in FIG. 1, two deterioration portions continuously extending along the division line with a width W1 and a width W2 (if the spots of the laser beams 14a and 14b at the focus points 34a and 34b, the spots being adjacent in the relative movement direction, overlap partially), or many deterioration portions located with spacing along the division line with the width W1 and the width W2 (if the spots of the laser beams 14a and 14b at the focus points 34a and 34b, the spots being adjacent in the relative movement direction, are located with spacing) are formed in the workpiece 2. As noted here, according to the first embodiment of the processing apparatus constructed in accordance with the present invention, the deterioration portions of the width W1 and the width W2 can be simultaneously formed, as desired, by the single laser beam application means 6 in the workpiece 2 in two regions displaced in the thickness direction of the workpiece 2.

If the deterioration portions of the width W1 and the width W2 are insufficient to divide the workpiece 2 sufficiently precisely along the division line, the following procedure is recommendable: The laser beam application means 6 and the holding means 4 are moved relative to each other over a predetermined distance in the optical axis direction, namely, in the up-and-down direction in FIG. 1, whereby the focus points 14a and 14b are displaced in the optical axis direction, accordingly, in the thickness direction of the workpiece 2. Further, the laser beam application means 6 and the holding means 4 are moved relative to each other along the division line. In this manner, in addition to the aforementioned formation of the previous deterioration portions, two deterioration portions continuously extending along the division line with the width W1 and the width W2, or many deterioration portions located with spacing along the division line with the width W1 and the width W2 are formed in the workpiece 2 at sites displaced in the thickness direction of the workpiece 2.

Figure 3:
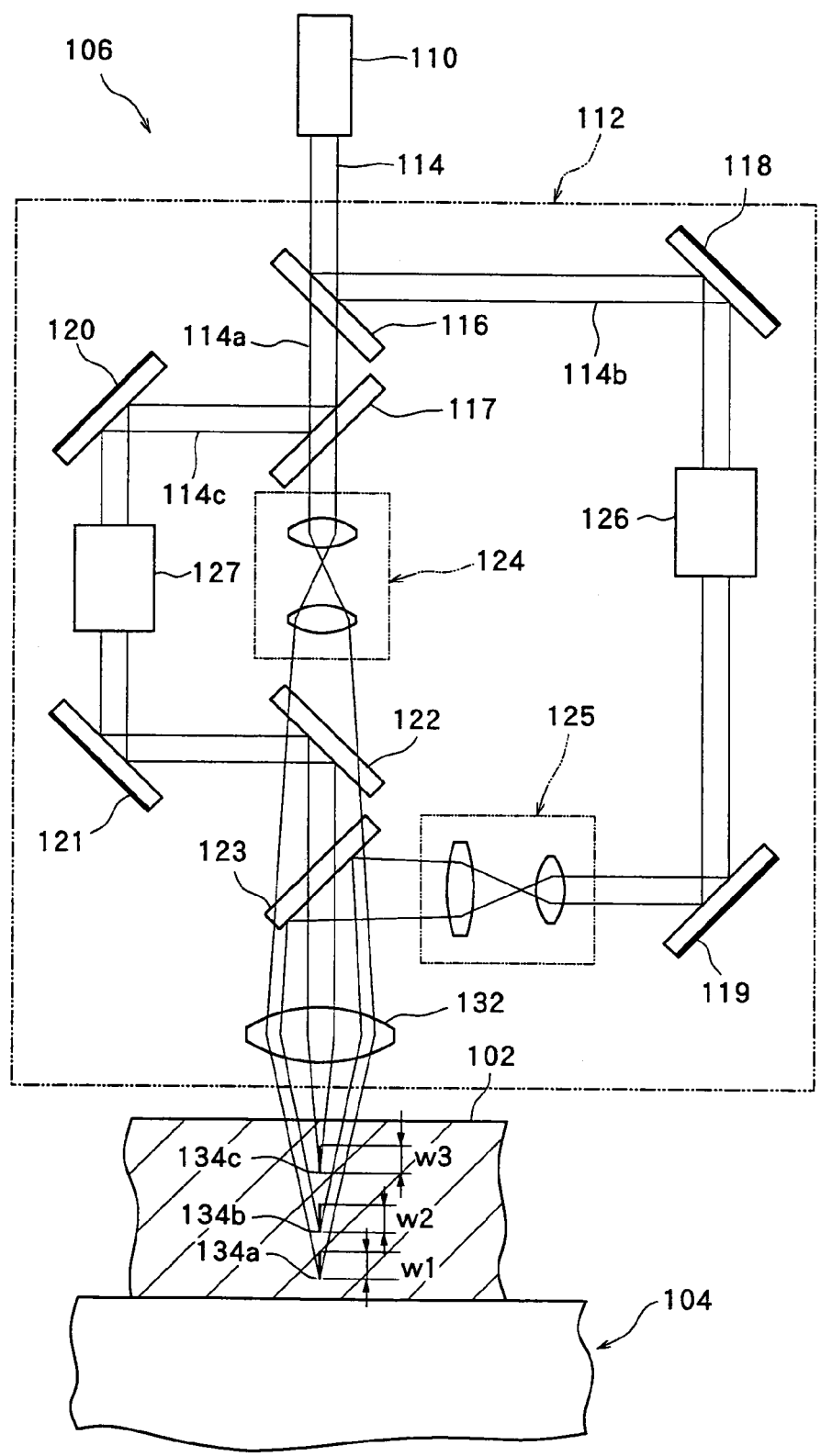
FIG. 3 is a schematic view showing another embodiment of a processing apparatus constructed in accordance with the present invention.

FIG. 3 shows another embodiment of a processing apparatus constructed in accordance with the present invention. The processing apparatus illustrated in FIG. 3 comprises holding means 104 for holding a workpiece 102, and laser beam application means 106. The holding means 104 may be of the same configuration as that of the holding means 4 in the embodiment illustrated in FIG. 1.

The laser beam application means 106 in the embodiment shown in FIG. 3 includes pulsed laser beam oscillation means 110, and transmitting/focusing means 112 for transmitting and focusing a pulsed laser beam 114 oscillated by the pulsed laser beam oscillation means 110. The pulsed laser beam oscillation means 110 may be substantially the same as the pulsed laser beam oscillation means 10 shown in FIG. 1. The transmitting/focusing means 112 in the embodiment illustrated in FIG. 3 includes a half mirror 116 functioning as a first splitter, a half mirror 117 functioning as a second splitter, a mirror 118, a mirror 119, a mirror 120, a mirror 121, a half mirror 122, a half mirror 123, first diameter changing means 124, second diameter changing means 125, first optical path length increasing means 126, second optical path length increasing means 127, and a common focusing lens 132. Each of the first diameter changing means 124 and the second diameter changing means 125 may be substantially the same as the diameter changing means 24 shown in FIG. 1, and each of the first optical path length increasing means 126 and the second optical path length increasing means 127 may be of substantially the same configuration as that of the optical path length increasing means 26 shown in FIG. 1. (However, as will be further mentioned later, the optical path length increased by the first optical path length increasing means 126, and the optical path length increased by the second optical path length increasing means 127 need to be different by a required length.)

Figure 4:
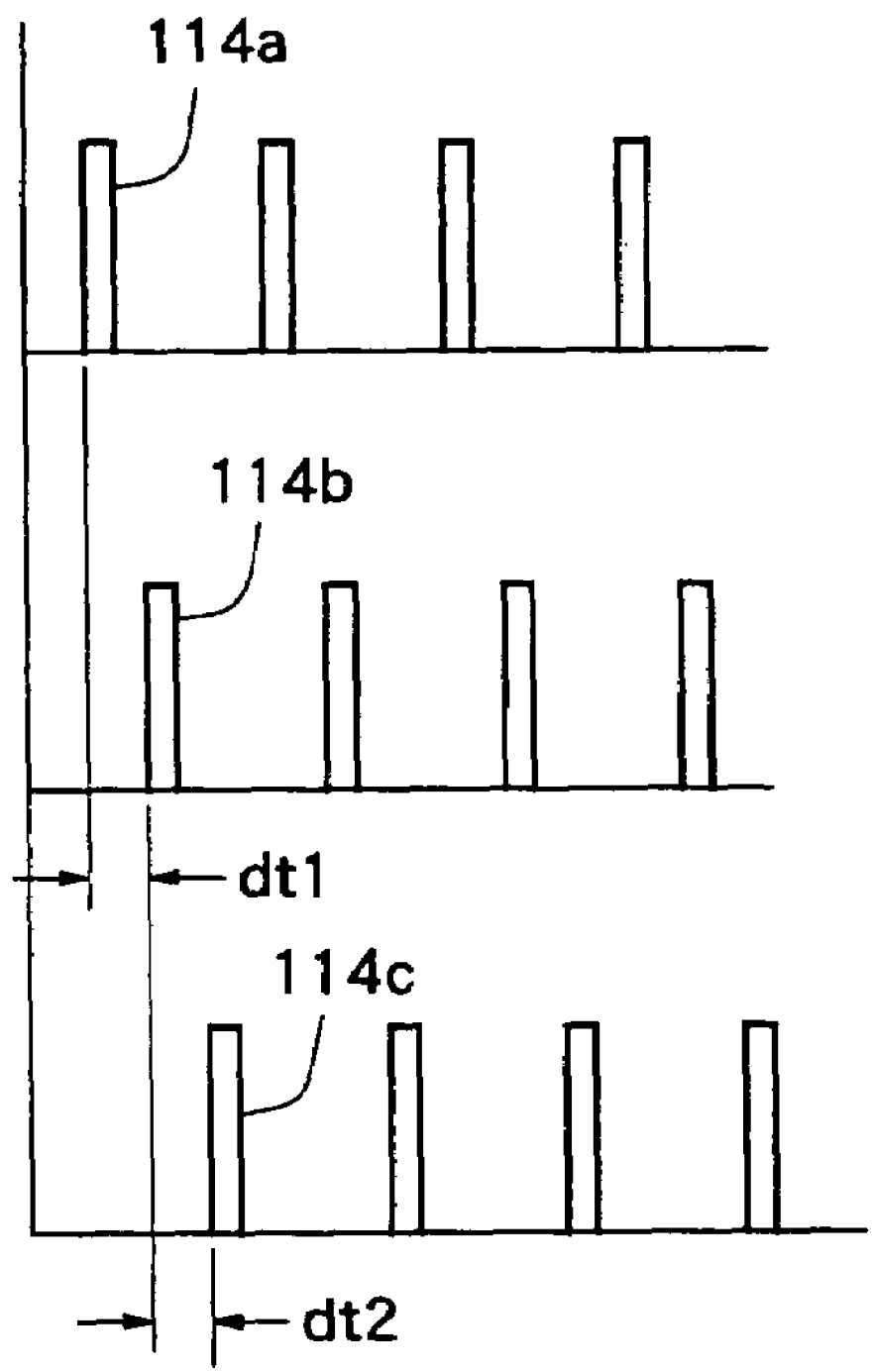
FIG. 4 is a graph showing a time difference during focusing among a first pulsed laser beam, a second pulsed laser beam, and a third pulsed laser beam in the processing apparatus of FIG. 3.

In the embodiment shown in FIG. 3, the pulsed laser beam 114 from the pulsed laser beam oscillation means 110 is separated into a first pulsed laser beam 114a which passes through the half mirror 116 and advances straightly, and a second pulsed laser beam 114b which is reflected by the half mirror 116 and changed in direction to a substantially perpendicular direction. The first pulsed laser beam 114a passes through the half mirror 117, and advances. During this motion, a third pulsed laser beam 114c, which is reflected by the half mirror 117 substantially perpendicularly, is separated from the first laser beam 114a. The first pulsed laser beam 114a passes through the diameter changing means 124, and thereby has its diameter changed, more specifically, is converted into a form in which its diameter gradually increases as the first pulsed laser beam 114a goes farther from the diameter changing means 124. Then, the first pulsed laser beam 114a passes through the half mirrors 122 and 123, and is focused by the focusing lens 132 to a focus point 134a in the workpiece 102. The second pulsed laser beam 114b is reflected by the mirror 118 and the mirror 119 to be changed in direction to a substantially perpendicular direction at each time, and then passes through the diameter changing means 125, thereby having its diameter changed, more specifically, being converted into a form in which its diameter gradually increases as the second pulsed laser beam 114b goes farther from the diameter changing means 125. Then, the second pulsed laser beam 114b is reflected by the half mirror 123 to be changed in direction to a substantially perpendicular direction, and is thereby brought into a state where its optical axis aligns with the optical axis of the first pulsed laser beam 114a. Then, the second pulsed laser beam 114b is focused by the focusing lens 132 to a focus point 134b in the workpiece 102. The third pulsed laser beam 114c is reflected by the mirror 120, the mirror 121 and the half mirror 122 to be changed in direction to a substantially perpendicular direction at each time, and is thereby brought into a state where its optical axis aligns with the optical axis of the first laser beam 114a. Then, the third pulsed laser beam 114c passes through the half mirror 123, and is focused by the focusing lens 132 to a focus point 134c in the workpiece 102. The focus point 134a, the focus point 134b, and the focus point 134c are displaced in the optical axis direction of the first pulsed laser beam 114a, the second pulsed laser beam 114b, and the third pulsed laser beam 114c. In addition, the second pulsed laser beam 114b passes through the first optical path length increasing means 126, and is thereby focused to the focus point 134b later by a required time difference dt1 than the first pulsed laser beam 114a being focused to the focus point 134a. The third pulsed laser beam 114c passes through the second optical path length increasing means 127, and is thereby focused to the focus point 134c later by a required time difference dt2 than the second pulsed laser beam 114b being focused to the focus point 134b. As shown in FIG. 4, these time differences dt1 and dt2 are preferably arranged such that the first pulsed laser beam 114a focused to the focus point 134a, the second pulsed laser beam 114b focused to the focus point 134b, and the third pulsed laser beam 114c focused to the focus point 134c are sequentially focused without overlapping each other in terms of time.

In the processing apparatus shown in FIG. 3, deterioration portions are formed in the workpiece 102, as required, in the vicinity of the focus points 134a, 134b and 134c, usually, in regions having some width W1, some width W2 and some width W3 from the focus points 134a, 134b and 134c upwards. After the first pulsed laser beam 114a is focused to the focus point 134a, the second pulsed laser beam 114b is focused to the focus point 134b. Thus, the deterioration in the region having the width W2 does not inhibit the focusing of the first pulsed laser beam 114a. After the second pulsed laser beam 114b is focused to the focus point 134b, the third pulsed laser beam 114c is focused to the focus point 134c. Thus, the deterioration in the region having the width W3 does not inhibit the focusing of the second pulsed laser beam 114b. Thus, the required deterioration can be generated in the respective regions having the widths W1, W2 and W3. When the laser beam application means 106 and the holding means 104 are relatively moved along the division line extending, for example, in the right-and-left direction in FIG. 3, three deterioration portions continuously extending along the division line with the width W1, the width W2 and the width W3, or many deterioration portions located with spacing along the division line with the width W1, the width W2 and the width W3 are formed in the workpiece 102. If the deterioration portions of the width W1, the width W2 and the width W3 are insufficient to divide the workpiece 102 sufficiently precisely along the division line, the following procedure is recommendable: The laser beam application means 106 and the holding means 104 are moved relative to each other over a predetermined distance in the optical axis direction, namely, in the up-and-down direction in FIG. 3, whereby the focus points 134a, 134b and 134c are displaced in the optical axis direction, accordingly, in the thickness direction of the workpiece 102. Further, the laser beam application means 106 and the holding means 104 are moved relative to each other along the division line. In this manner, in addition to the aforementioned formation of the previous deterioration portions, three deterioration portions continuously extending along the division line with the width W1, the width W2 and the width W3, or many deterioration portions located with spacing along the division line with the width W1, the width W2 and the width W3 are formed in the workpiece 102 at sites displaced in the thickness direction of the workpiece 102.

What we claim is:

1. A processing apparatus using a laser beam comprising:
   holding means for holding a workpiece, and
   laser beam application means for irradiating the workpiece held by said holding means with a pulsed laser beam capable of passing through the workpiece thereby deteriorating the workpiece,
   said laser beam application means including pulsed laser beam oscillation means and transmitting/focusing means for transmitting and focusing a pulsed laser beam oscillated by said pulsed laser beam oscillation means,
   the workpiece and said pulsed laser beam being relatively movable with respect to each other:
   wherein said transmitting/focusing means includes:
   a splitter for dividing the pulsed laser beam from said pulsed laser oscillation means into a first pulsed laser beam separated from a second pulsed laser beam;
   a diameter changing means for changing the diameter of either the first pulsed laser beam or the second pulsed laser beam;
   optical path length increasing means for increasing the optical path length of either the first pulsed laser beam or the second pulsed laser beam to provide a later arriving pulsed beam to the workpiece;
   a half mirror for aligning an optical axis of the first pulsed laser beam split by said splitter with an optical axis of the second pulsed laser beam;
   a plurality of mirrors arranged between said splitter and said half mirror for returning the first pulsed laser beam to said half mirror; and
   a common focusing lens arranged beneath a lower side of said half mirror for focusing and staggering focusing points of the first pulsed laser beam and the second pulsed laser beam in the direction of the optical axis so that one of the first pulsed laser beam and the second pulsed laser beam will have a focus point deeper in the workpiece than the other,
   wherein the length of said optical path length increasing means provides that the later arriving pulsed beam arrives between successive pulses of the pulsed laser beam that has not been made to arrive later, and
   wherein the one of the first and second pulsed laser beams that is focused deeper in the workpiece first is applied to the workpiece, in a coaxial direction of the optical axis, while the workpiece and the pulsed laser beam are moved relatively.

2. The processing apparatus using a laser beam according to claim 1, wherein said optical path length increasing means includes an optical fiber.

3. The processing apparatus using a laser beam according to claim 1, wherein said optical path length increasing means includes a plurality of mirrors.

4. The processing apparatus using a laser beam according to claim 1, wherein a plurality of focus points are formed by displacing the pulsed laser beam in the direction of the optical axis by said diameter changing means, and the beams are focused so as to provide the time difference to at least the two focus points.

5. The processing apparatus using a laser beam according to claim 1, wherein said workpiece is a wafer.

* * * * *